US011713987B2

(12) United States Patent
Berntsen et al.

(10) Patent No.: US 11,713,987 B2
(45) Date of Patent: Aug. 1, 2023

(54) INSERTABLE FLOW METER ASSEMBLY

(71) Applicant: OneSubsea IP UK Limited, London (GB)

(72) Inventors: Kjetil Berntsen, Sandsli (NO); Thomas McIlroy, Aberdeen (GB); Alexandre Lupeau, Sandsli (NO); Phillip Rice, Aberdeen (GB)

(73) Assignee: OneSubsea IP UK Limited, London (GB)

( * ) Notice: Subject to any disclaimer, the term of this patent is extended or adjusted under 35 U.S.C. 154(b) by 52 days.

(21) Appl. No.: 16/949,743

(22) Filed: Nov. 12, 2020

(65) Prior Publication Data
US 2022/0146290 A1  May 12, 2022

(51) Int. Cl.
*E21B 34/02* (2006.01)
*E21B 47/10* (2012.01)
*G01F 1/44* (2006.01)
*G01F 15/00* (2006.01)

(52) U.S. Cl.
CPC .............. *G01F 1/44* (2013.01); *E21B 34/025* (2020.05); *E21B 47/10* (2013.01); *G01F 15/005* (2013.01)

(58) Field of Classification Search
CPC ........ E21B 34/02; E21B 34/025; E21B 47/06; E21B 47/10; G01F 1/44; G01F 15/005
See application file for complete search history.

(56) References Cited

U.S. PATENT DOCUMENTS

| 5,135,684 | A | * | 8/1992 | Mohn | ............... B01F 25/31241 366/101 |
| 5,404,758 | A | | 4/1995 | Huber et al. | |
| 6,076,551 | A | | 6/2000 | Miyazoe | |
| 7,596,996 | B2 | | 10/2009 | Zollo et al. | |
| 7,992,434 | B2 | * | 8/2011 | Zollo | ..................... E21B 34/04 166/348 |

(Continued)

FOREIGN PATENT DOCUMENTS

| EP | 2072971 A1 | 6/2009 |
| EP | 1926991 B1 | 4/2014 |

OTHER PUBLICATIONS

Murphy, "Measuring Multiphase Flow," Houston, Texas; Oil and Gas Online accessed at https://www.oilandgasonline.com/doc/measuring-multiphase-flow-0001 on Nov. 12, 2020, 5 pages.

(Continued)

*Primary Examiner* — Matthew R Buck
(74) *Attorney, Agent, or Firm* — Eileen Pape

(57) ABSTRACT

An insertable flow meter assembly includes a flow measuring device configured to be inserted into a flow passage of a receiving structure. The flow measuring device is configured to enable determination of a flow rate of fluid through the flow passage, the flow measuring device is formed as a single continuous structure, and an outer cross-section of at least a portion of the flow measuring device is configured to be substantially the same as an inner cross-section of the flow passage. The insertable flow meter assembly also includes an end cap configured to engage an exterior surface of the receiving structure and to couple to the receiving structure at an end of the flow passage. The end cap is configured to block movement of the flow measuring device out of the end of the flow passage.

18 Claims, 7 Drawing Sheets

(56) References Cited

U.S. PATENT DOCUMENTS

| | | | | |
|---|---|---|---|---|
| 8,104,337 B2* | 1/2012 | Zollo | ............... | E21B 47/10 |
| | | | | 166/348 |
| 8,479,571 B2* | 7/2013 | Zollo | ............... | E21B 34/04 |
| | | | | 73/152.29 |
| 9,169,709 B2* | 10/2015 | Vincent | ............ | E21B 34/02 |
| 9,702,215 B1* | 7/2017 | Murphy | ............ | E21B 34/04 |
| 10,072,958 B2* | 9/2018 | Betz | ............... | G01F 1/44 |
| 10,184,310 B2* | 1/2019 | McHugh | ............ | E21B 49/08 |
| 10,711,594 B2* | 7/2020 | Rustad | ............ | G01F 1/74 |
| 2012/0174993 A1 | 7/2012 | McHugh | | |
| 2017/0211350 A1* | 7/2017 | Rustad | ............ | E21B 34/04 |

OTHER PUBLICATIONS

Search Report and Written Opinion of International Patent Application No. PCT/US2021/058894 dated Feb. 23, 2022; 11 pages.
U.S. Appl. No. 16/949,743.

* cited by examiner

INSERTABLE FLOW METER ASSEMBLY

BACKGROUND

The present disclosure relates generally to an insertable flow meter assembly.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Fluids (e.g., hydrocarbons) may be extracted from subsurface reservoirs and transported to the surface for commercial sale, such as for use in the power industry, transportation industry, manufacturing industry, and other applicable industries. For example, a well may be drilled into the ground to a subsurface reservoir, and equipment may be installed in the well and on the surface to facilitate extraction of the fluids. In some cases, the wells may be offshore (e.g., subsea), and the equipment may be disposed underwater, on offshore platforms, on floating systems, or a combination thereof.

The equipment may include one or more flow meters, and each flow meter may be configured to monitor the flow rate of fluid (e.g., gas, liquid, etc.) through a respective flow passage. The flow meter may include a body having an internal passage that forms a flow measuring device (e.g., venturi). The body may also include a flange positioned on each longitudinal end of the body. Accordingly, a first flange of the body of the flow meter may be coupled to a corresponding flange of a fluid input, and a second flange of the body of the flow meter may be coupled to a corresponding flange of a fluid output. The material forming the body and the thickness of the material surrounding the internal flow passage may be particularly selected to contain the pressure of the fluid flowing through the internal flow passage of the body. In addition, the shape/geometry of the flow measuring device (e.g., venturi) may be particularly selected based on the application (e.g., type of fluid, density of the fluid, expected flow rate of the fluid, etc.). Accordingly, a large number of flow meters may be designed to suit a variety of applications and expected fluid pressures, thereby significantly increasing the costs associated with extraction of fluids from subsurface reservoirs. In addition, because each flow meter is coupled to the respective fluid input and the respective fluid output by flanges, the process of removing and replacing a flow meter (e.g., for a different application) may be complex, time-consuming, and expensive. Furthermore, because the body includes a significant amount of material to contain the pressure of the fluid, the flow meter may be expensive to produce and have a large size. Due to the large size of the flow meter, utilizing the flow meter to measure flow rates within space-limited environments may be difficult.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, an insertable flow meter assembly includes a flow measuring device configured to be inserted into a flow passage of a receiving structure. The flow measuring device is configured to enable determination of a flow rate of fluid through the flow passage, the flow measuring device is formed as a single continuous structure, and an outer cross-section of at least a portion of the flow measuring device is configured to be substantially the same as an inner cross-section of the flow passage. The insertable flow meter assembly also includes an end cap configured to engage an exterior surface of the receiving structure and to couple to the receiving structure at an end of the flow passage. The end cap is configured to substantially seal the end of the flow passage, and the end cap is configured to block movement of the flow measuring device out of the end of the flow passage.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
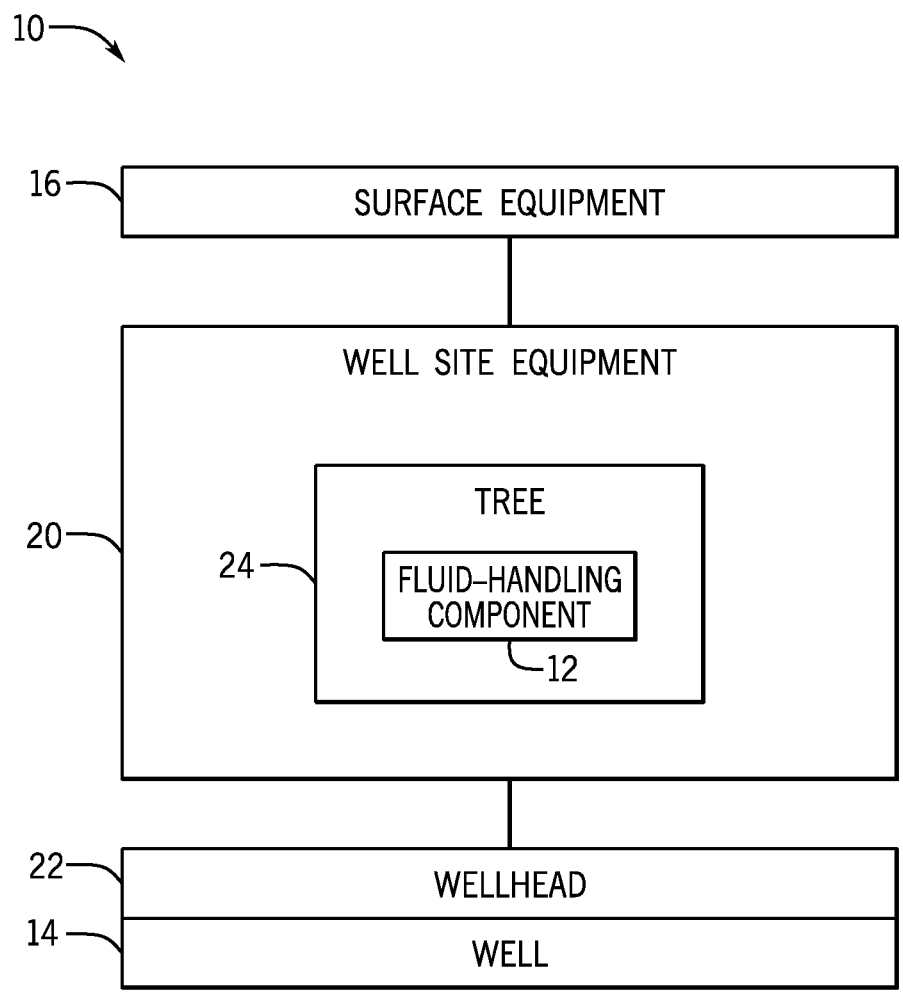
FIG. 1 is a block diagram of an embodiment of a resource extraction system.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

As explained above, certain flow meters may be expensive to design and manufacture, and may be difficult to install in space-limited environments. For example, certain flow meters may include a body having an internal passage that forms a flow measuring device (e.g., venturi). The body may also include a flange positioned on each longitudinal end of the body. Accordingly, a first flange of the body of the flow meter may be coupled to a corresponding flange of a fluid input, and a second flange of the body of the flow meter may be coupled to a corresponding flange of a fluid output. The material forming the body and the thickness of the material surrounding the internal flow passage may be particularly selected to contain the pressure of the fluid flowing through the internal flow passage of the body. In addition, the shape/geometry of the flow measuring device (e.g., venturi) may be particularly selected based on the application (e.g., type of fluid, density of the fluid, expected flow rate of the fluid, etc.). Accordingly, a large number of flow meters may be designed and manufactured to suit a variety of applications and expected fluid pressures, thereby significantly increasing the costs associated with extraction of fluids from subsurface reservoirs. In addition, because each flow meter is coupled to the respective fluid input and the respective fluid output by flanges, the process of removing and replacing a flow meter (e.g., for a different application) may be complex, time-consuming, and expensive. Furthermore, because the body includes a significant amount of material to contain the pressure of the fluid, the flow meter may be expensive to produce and have a large size. Due to the large size of the flow meter, utilizing the flow meter to measure flow rates within space-limited environments may be difficult.

In certain embodiments disclosed herein, an insertable flow meter includes a flow measuring device (e.g., including a venturi) configured to be inserted into a flow passage of a receiving structure (e.g., choke body, etc.). The flow measuring device is configured to enable determination of a flow rate of fluid through the flow passage. In addition, the flow measuring device is formed as a single continuous structure (e.g., from a single piece of material), and an outer cross-section of at least a portion of the flow measuring device is configured to be substantially the same as an inner cross-section of the flow passage. The insertable flow meter assembly also includes an end cap configured to engage an exterior surface of the receiving structure and to couple to the receiving structure at an end of the flow passage. The end cap is configured to substantially seal the end of the flow passage, and the end cap is configured to block movement of the flow measuring device out of the end of the flow passage. Because the receiving structure (e.g., choke body, etc.) is configured to contain the pressure of the fluid flowing through the flow passage, the size of the flow meter may be substantially reduced, thereby enabling the insertable flow meter assembly to be used within space-limited environments. In addition, because the receiving structure is configured to contain the pressure of the fluid flowing through the flow passage, the amount of material within the flow meter assembly may be substantially reduced, thereby substantially reducing the cost of the flow meter assembly. Furthermore, because the receiving structure is configured to contain the pressure of the fluid flowing through the flow passage, a single flow measuring device may be used for a variety of fluid pressures, thereby reducing the number of flow meter assembly types, which may reduce design costs. In addition, the flow measuring device may be removed and replaced by removing the end cap, extracting the flow measuring device, inserting a new flow measuring device into the flow passage, and replacing the end cap. Accordingly, the process of replacing the flow measuring device may be significantly less complex and time-consuming, as compared to removing and replacing a flow meter coupled to a respective fluid input and a respective fluid output by flanges.

FIG. 1 is a block diagram of an embodiment of a resource extraction system 10 (e.g., a mineral extraction system, a fluid extraction system, a hydrocarbon extraction system, a well system, etc.) having a fluid-handling component 12 (e.g., including a choke assembly, etc.). In the illustrated embodiment, the resource extraction system 10 facilitates extraction of a resource, such as oil or natural gas, from a well 14. As shown, the resource extraction system 10 includes a variety of equipment, such as surface equipment 16 and well site equipment 20, for extracting the resource from the well 14 via a wellhead 22. The surface equipment 16 may include a variety of devices and systems, such as pumps, conduits, valves, power supplies, cable and hose reels, control units, a diverter, a gimbal, a spider, and the like. As shown, the well site equipment 20 includes a production tree 24, also commonly referred to as a "Christmas tree." The tree 24 may include fluid-handling component 12 that control the flow of an extracted resource out of the well 14 and upward toward the surface equipment 16. In addition, the tree 24 may include various valves, conduits, flow meters, sensors, and so forth. While the fluid-handling component 12 is part of the tree 24 in the illustrated embodiment, in other embodiments, the fluid-handling component 12 disclosed herein may be used in any suitable portion of the resource extraction system 10, such as the surface equipment 16, the well site equipment 20, the wellhead 22, subsea equipment, another suitable portion of the resource extraction system 10, or a combination thereof.

In certain embodiments, the fluid-handling component 12 includes a choke assembly, and an insertable flow meter assembly may be employed within the choke assembly. As discussed in detail below, the insertable flow meter assembly includes a flow measuring device (e.g., including a venturi) configured to be inserted into a flow passage of a body of the choke assembly. The flow measuring device is configured to enable determination of a flow rate of fluid through the flow passage. In addition, the flow measuring device is formed as a single continuous structure (e.g., from a single piece of material), and an outer cross-section of at least a portion of the flow measuring device is configured to be substantially the same as an inner cross-section of the flow passage. The insertable flow meter assembly also includes an end cap configured to engage an exterior surface of the choke body and to couple to the choke body at an end of the flow passage. The end cap is configured to substantially seal the end of the flow passage, and the end cap is configured to block movement of the flow measuring device out of the end of the flow passage. Because the choke body is configured to contain the pressure of the fluid flowing through the flow passage, the size of the insertable flow meter assembly may be substantially reduced (e.g., as compared to a flow meter configured to contain the fluid pressure), thereby enabling the insertable flow meter assembly to be used within space-limited environments. In addition, because the choke body is configured to contain the pressure of the fluid flowing through the flow passage, the amount of material within the insertable flow meter assembly may be substantially reduced (e.g., as compared to a flow meter configured to contain the fluid pressure), thereby substantially reducing the cost of the insertable flow meter assembly. Furthermore, the flow measuring device may be removed and replaced by removing the end cap, extracting the flow measuring device, inserting a new flow measuring device into the flow passage, and replacing the end cap. Accordingly, the process of replacing the flow measuring device may be significantly less complex and time-consuming, as compared to removing and replacing a flow meter coupled to a respective fluid input and a respective fluid output by flanges.

Figure 2:
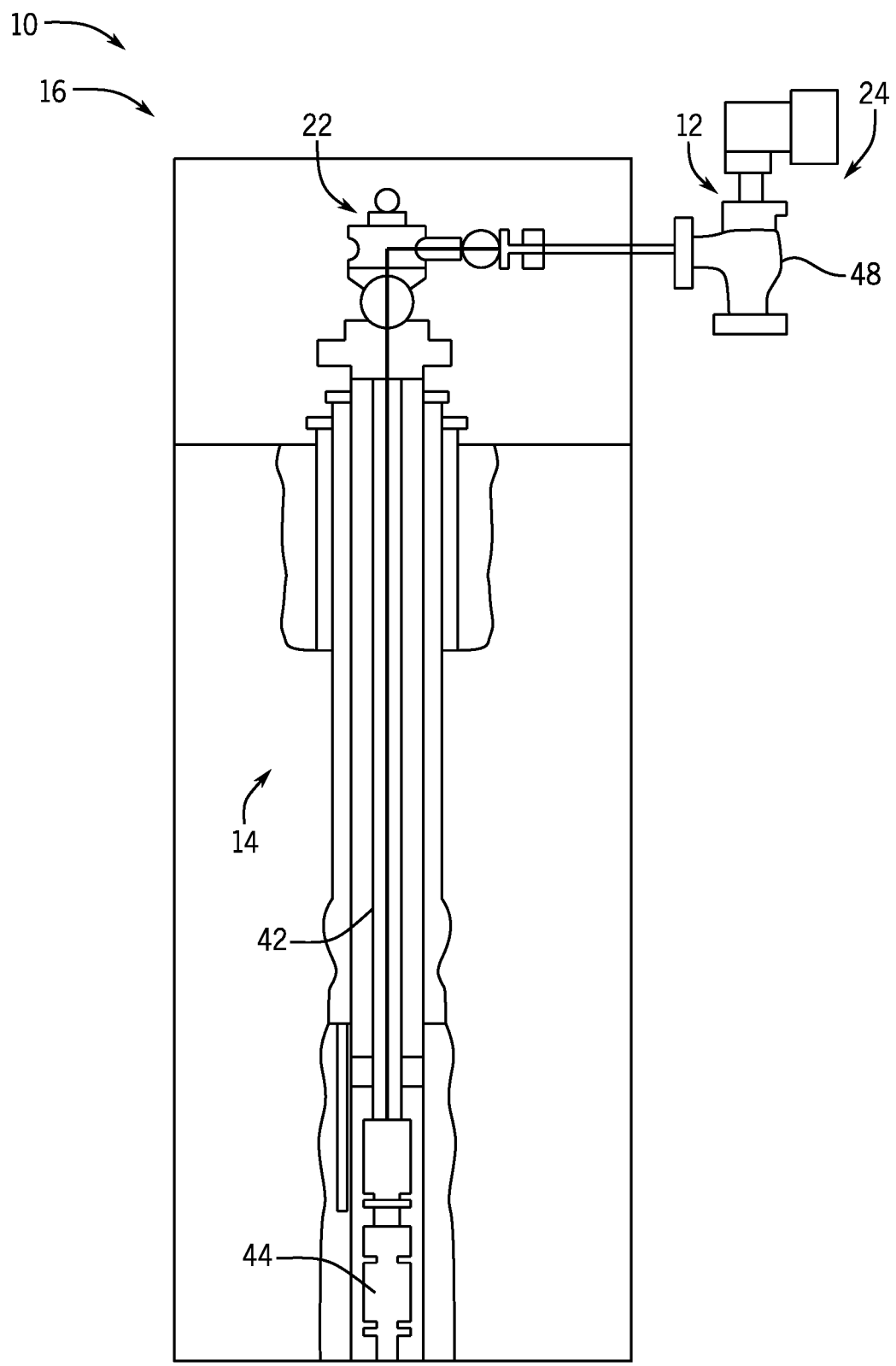
FIG. 2 is a schematic diagram of an embodiment of a resource extraction system.

FIG. 2 is a schematic diagram of an embodiment of a resource extraction system 10. As described above, the resource extraction system 10 facilitates extraction of a resource/fluid from the well 14. The resource extraction system 10 includes tubing 42 and a pump 44 (e.g., an electro-submersible pump) disposed adjacent to the tubing 42. The pump 44 may pump the resource/fluid from a reservoir 46 and into the tubing 42. In certain embodiments, the resource extraction system 10 may include a surface pump in addition to and/or in place of the pump 44, such that the surface pump may pump the resource/fluid from the reservoir 46 and into the tubing 42. In some embodiments, the resource extraction system 10 may not include a pump, such that the resource/fluid flows naturally from the reservoir 46 and into the tubing 42. The resource extraction system 10 causes the resource/fluid to flow from the reservoir 46, through the pump 44, through the tubing 42, through the wellhead 22, and through the fluid-handling component 12. In the illustrated embodiment, the fluid handling component 12 includes a choke assembly 48 that controls a flow rate of a produced fluid (e.g., oil, gas, water, or a combination thereof) from the well 14.

In certain embodiments, the choke assembly 48 includes an inlet flow passage configured to receive the fluid, and the choke assembly 48 includes an intermediate flow passage offset from the inlet flow passage and configured to receive the fluid from the inlet flow passage. In addition, the choke assembly 48 includes an outlet flow passage configured to receive the fluid from the intermediate flow passage, and the choke assembly 48 includes a valve assembly configured to control flow of the fluid through the outlet flow passage. The choke assembly 48 also includes an insertable flow meter assembly, and the insertable flow meter assembly includes a flow measuring device disposed within the intermediate flow passage. The flow measuring device is configured to enable determination of a flow rate of the fluid through the intermediate flow passage. In certain embodiments, the flow measuring device is formed as a single continuous structure (e.g., from a single piece of material), and an outer cross-section of the flow measuring device is substantially the same as an inner cross-section of the intermediate flow passage. The insertable flow meter assembly also includes an end cap engaged with an exterior surface of a body of the choke assembly and coupled to the body of the choke assembly at an end of the intermediate flow passage. The end cap is configured to block movement of the flow measuring device out of the end of the intermediate flow passage, and the end cap is configured to substantially seal the end of the intermediate flow passage.

Figure 3:
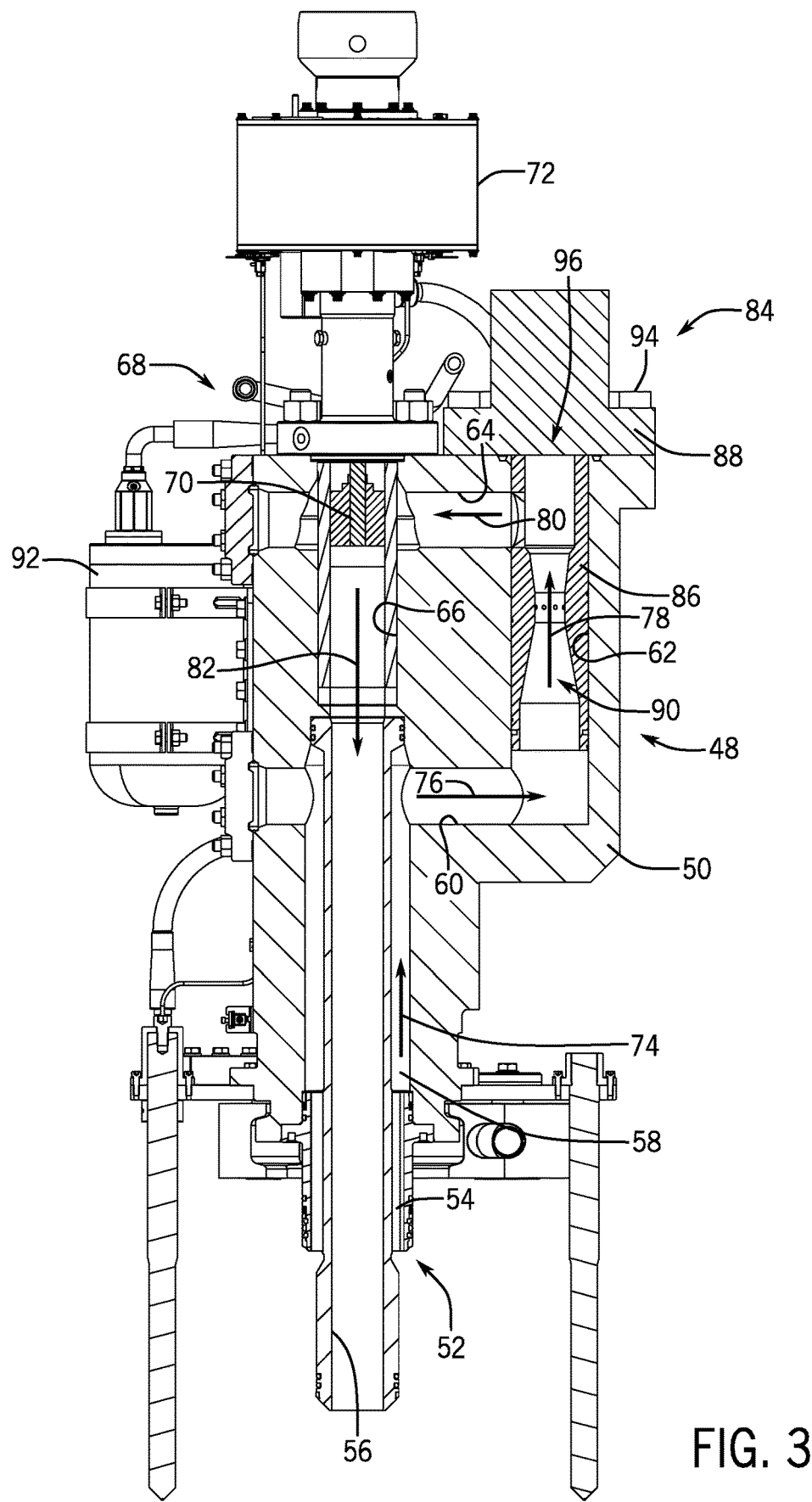
FIG. 3 is a cross-sectional view of an embodiment of a choke assembly that may be employed within the resource extraction system of FIG. 1 and/or the resource extraction system of FIG. 2.

FIG. 3 is a cross-sectional view of an embodiment of a choke assembly 48 that may be employed within the resource extraction system of FIG. 1 and/or the resource extraction system of FIG. 2 (e.g., within the fluid-handling component of the resource extraction system). In the illustrated embodiment, the choke assembly 48 includes a body 50 and a tubing assembly 52 coupled to the body 50 (e.g., via a threaded coupling, etc.). The tubing assembly 52 includes an inlet flow passage 54 and an outlet flow passage 56. The inlet flow passage 54 is configured to receive fluid (e.g., gas, etc.) from the well, and the outlet flow passage 56 is configured to output the fluid (e.g., gas, etc.) to a flow line, which may be fluidly coupled to a downstream component of the resource extraction system. The inlet flow passage may be annular (e.g., forming an annulus), the inlet flow passage may be formed by multiple ports distributed along a circumferential axis, or the inlet flow passage may have another suitable configuration. In the illustrated embodiment, the inlet flow passage 54 and the outlet flow passage 56 are coaxial, and the inlet flow passage 54 is positioned radially outward from the outlet flow passage 56. However, in other embodiments, the outlet flow passage may be positioned radially outward from the inlet flow passage, or the inlet and outlet flow passages of the tubing assembly may not be coaxial.

As illustrated, the inlet flow passage 54 of the tubing assembly 52 is fluidly coupled to a corresponding inlet flow passage 58 (e.g., annulus) of the body 50, and the inlet flow passage 58 of the body 50 is fluidly coupled to a first flow passage 60 extending through the body 50. In the illustrated embodiment, the first flow passage 60 extends substantially perpendicularly from the inlet flow passage 58 of the body 50. However, in other embodiments, the first flow passage may extend at any other suitable angle relative to the body inlet flow passage. Furthermore, an intermediate flow passage 62 extends from the first flow passage 60 and is fluidly coupled to the first flow passage 60. In the illustrated embodiment, the intermediate flow passage 62 extends substantially perpendicularly from the first flow passage 60. However, in other embodiments, the intermediate flow passage may extend at any other suitable angle relative to the first flow passage. In addition, a second flow passage 64 extends from the intermediate flow passage 62 and is fluidly coupled to the intermediate flow passage 62. In the illustrated embodiment, the second flow passage 64 extends substantially perpendicularly from the intermediate flow passage 62. However, in other embodiments, the second flow passage may extend at any other suitable angle relative to the intermediate flow passage. As used herein, "substantially perpendicularly" refers to a difference in orientation of greater than 45 degrees, greater than 60 degrees, greater than 75 degrees, greater than 80 degrees, greater than 85 degrees, or greater than 88 degrees.

Furthermore, the body 50 of the choke assembly 48 has an outlet flow passage 66 fluidly coupled to the outlet flow passage 56 of the tubing assembly 52. In the illustrated embodiment, the outlet flow passage 66 of the body 50 is substantially aligned with the outlet flow passage 56 of the tubing assembly 52. However, in other embodiments, the outlet flow passages may be angled relative to one another. As illustrated, the choke assembly 48 includes a valve assembly 68 configured to control flow of the fluid through the outlet flow passage 66 of the body 50 and the outlet flow passage 56 of the tubing assembly 52. In the illustrated embodiment, the valve assembly 68 includes a valve 70 (e.g., plunger valve, gate valve, ball valve, needle valve, etc.) and an actuator 72 (e.g., hydraulic actuator, pneumatic actuator, electromechanical actuator, etc.) coupled to the valve 70. The actuator 72 is configured to control a position of the valve 70, thereby controlling the flow of the fluid through the outlet flow passages.

During operation of the resource extraction system, the fluid (e.g., gas, etc.) enters the inlet flow passage 54 of the tubing assembly 52 and the inlet flow passage 58 of the body 50 of the choke assembly 48 along a first flow direction 74. The fluid is then received by the first flow passage 60 and flows through the first flow passage 60 along a second flow direction 76. Next, the fluid is received by the intermediate flow passage 62 and flows through the intermediate flow passage 62 along a third flow direction 78. The flow is then received by the second flow passage 64 and flows through the second flow passage 64 along a fourth flow direction 80 to the valve 70 of the valve assembly 68. From the valve 70, the fluid flows through the outlet flow passage 66 of the body 50 and the outlet flow passage 56 of the tubing assembly 52 along a fifth flow direction 82. The valve assembly 68 controls the flow of the fluid through the flow passages.

Due to the extent of the first flow passage 60 and the extent of the second flow passage 64, the intermediate flow passage 62 is offset from the inlet flow passage 54 of the tubing assembly 52, the inlet flow passage 58 of the body 50, the outlet flow passage 66 of the body 50, and the outlet flow passage 56 of the tubing assembly 52. In the illustrated embodiment, the intermediate flow passage 62 is radially offset from the inlet flow passages and the outlet flow passages. However, in other embodiments, the intermediate flow passage may be angularly offset from the inlet flow passage(s) and/or the outlet flow passage(s) (e.g., alone or in combination with the radial offset). As used herein, "offset" refers to flow passages that are not coaxial with one another. While the intermediate flow passage is offset from the inlet flow passages and the outlet flow passages in the illustrated embodiment, in other embodiments, the intermediate flow passage (e.g., the flow passage that contains the flow measuring device) may be coaxial with at least one of the inlet flow passage of the tubing assembly, the inlet flow passage of the body, the outlet flow passage of the body, or the outlet flow passage of the tubing assembly.

In the illustrated embodiment, the choke assembly 48 includes an insertable flow meter assembly 84. The insertable flow meter assembly 84 includes a flow measuring device 86 and an end cap 88. As illustrated, the flow measuring device 86 is disposed within the intermediate flow passage 62 of the body 50. The flow measuring device 86 is configured to enable determination of a flow rate of the fluid through the intermediate flow passage 62 (e.g., through the flow passages of the choke assembly 48). In the illustrated embodiment, the flow measuring device 86 includes a venturi 90 having an inlet, an outlet, and a throat. As used herein, "throat" refers to a portion of the flow measuring device that establishes a narrower flow path for the fluid, as compared to the flow path at the inlet and the flow path at the outlet. As discussed in detail below, a fluid monitoring system 92 may be fluidly coupled to the throat and to the inlet or outlet, and the fluid monitoring system 92 may be configured to determine the flow rate of the fluid through the intermediate flow passage 62 based on a first pressure at the throat of the venturi 90 and a second pressure at the inlet or outlet of the venturi 90 (e.g., a pressure differential between the throat and the inlet or outlet). While the flow measuring device 86 includes a venturi 90 in the illustrated embodiment, in other embodiments, the flow measuring device may include any other suitable structure configured to facilitate determination of the flow rate of the fluid through the intermediate flow passage (e.g., an orifice plate, a conical structure, etc.).

As illustrated, the end cap 88 is engaged with an exterior surface of the body 50 of the choke assembly 48, and the end cap 88 is coupled to the body 50. In the illustrated embodiment, the end cap 88 is coupled to the body 50 by fasteners 94. However, in other embodiments, the end cap may be coupled to the body by another other suitable connection system (e.g., alone or in combination with the fasteners), such as clamp(s), a welded connection, another suitable/industry accepted type of connection, or a combination thereof. The end cap 88 is configured to substantially seal an end 96 of the intermediate flow passage 62, thereby substantially blocking fluid from flowing out of the body of the choke assembly at the end of the intermediate flow passage. In addition, the end cap 88 is configured to block movement of the flow measuring device 86 out of the end 96 of the intermediate flow passage 62.

In certain embodiments, the end cap 88 may be configured to directly contact the flow measuring device 86 to block movement of the flow measuring device 86 out of the end 96 of the intermediate flow passage 62. Furthermore, in certain embodiments, a gasket may be disposed between the flow measuring device and the end cap to enhance a seal between apertures of the flow measuring device and apertures of the end cap. For example, in certain embodiments, the flow measuring device may include a first conduit configured to receive fluid from the throat of the venturi and a second conduit configured to receive fluid from the inlet or outlet of the venturi. Each conduit may terminate at a respective aperture of the flow measuring device. The end cap may include corresponding apertures configured to receive the fluid from the apertures of the flow measuring device, and the end cap may include conduits extending through the end cap from the respective end cap apertures. The fluid monitoring system may be fluidly coupled to the conduits extending through the end cap, thereby enabling the fluid monitoring system to receive fluid from the throat and the inlet or outlet of the venturi. In such embodiments, a gasket (e.g., formed from a polymeric material, etc.) may be disposed between the flow measuring device and the end cap, and the gasket may include apertures configured to align with the apertures of the end cap and the apertures of the flow measuring device. Accordingly, the gasket may establish a seal between the apertures of the end cap and the apertures of the flow measuring device (e.g., as the surrounding structures expand and contract with temperature). Furthermore, in certain embodiments, the gasket may include an alignment element configured to facilitate alignment of the gasket apertures with the end cap/flow measuring device apertures. For example, the alignment element may include protrusion(s) configured to engage recess(es) in the flow measuring device and/or the end cap.

In certain embodiments (e.g., in embodiments in which the flow measuring device is not structurally coupled to the end cap), movement of the flow measuring device away from the end cap along the intermediate flow passage may be blocked by a shoulder within the intermediate flow passage. In such embodiments, an inner cross-section of the shoulder may be substantially the same as the inner cross-section of the flow measuring device at the inlet. Furthermore, while the flow measuring device 86 is not structurally coupled to the end cap 88 in the illustrated embodiment, in other embodiments, the flow measuring device may be structurally coupled to the end cap (e.g., by any suitable connection, such as a welded connection, an adhesive connections, via fastener(s), etc.). For example, the end cap and the flow measuring device may be integrally formed as a single continuous structure (e.g., from a single piece of material). In addition, while the flow measuring device 86 is coupled to the body 50 of the choke assembly 48 via the end cap 88 in the illustrated embodiment, in other embodiments, the flow measuring device may be coupled to the body of the choke assembly by other suitable connection(s) (e.g., alone or in combination with the end cap). For example, in certain embodiments, the flow measuring device may be coupled to the body of the choke assembly by a threaded connection, a welded connection, one or more fasteners, an adhesive connection, a magnetic connection, a protrusion/recess connection, other suitable connection(s), or a combination thereof.

In the illustrated embodiment, an outer cross-section of at least a portion of the flow measuring device 86 is substantially the same as an inner cross-section of the intermediate flow passage 62 (e.g., to substantially block fluid flow around the flow measuring device). For example, the outer cross-section of a substantial portion of the flow measuring device may be substantially the same as the inner cross-section of the intermediate flow passage. As used herein, "substantially the same" refers to a similarity in cross-sections that causes fluid flow around the flow measuring device to be substantially blocked (e.g., due to compression of seal(s) between the flow measuring device and the respective flow passage) and that enables the flow measuring device to be inserted into and removed from the respective flow passage (e.g., at a target temperature). For example, a difference in cross-sectional areas may be less than 5 percent, less than 3 percent, less than 1 percent, less than 0.5 percent, or less than 0.1 percent. In the illustrated embodiment, a substantial portion of the flow measuring device 86 has a circular cross-section, and the intermediate flow passage 62 has a circular cross-section. Accordingly, an outer diameter of at least a portion of the flow measuring device is substantially equal to an inner diameter of the intermediate flow passage. Furthermore, as discussed in detail below, the flow measuring device may include one or more annular recesses, and each annular recess may be configured to receive a seal (e.g., o-ring). Each seal is configured to contact the inner surface of the intermediate flow passage to block flow of the fluid around the flow measuring device. However, in other embodiments, the annular recess(es)/seal(s) may be omitted. In addition, in certain embodiments, a gap may be formed between the flow measuring device and the intermediate flow passage to facilitate flow of a portion of the fluid around the flow measuring device.

In the illustrated embodiment, the flow measuring device 86 is formed as a single continuous structure (e.g., from a single piece of material). For example, in certain embodiments, the flow measuring device (e.g., including the venturi and the annular recess(es)) may be machined from a single piece of material (e.g., steel, etc.). Furthermore, in certain embodiments, the flow measuring device (e.g., including the venturi and the annular recess(es)) may be formed by an additive manufacturing process or a sintering process. As used herein, "single continuous structure" refers to a single piece or element, as compared to multiple pieces or elements coupled (e.g., removably coupled) to one another to form a structure. While a flow measuring device formed from a single piece of material is disclosed above, in certain embodiments, the flow measuring device may be formed from multiple materials (e.g., via an additive manufacturing process or a sintering process). Furthermore, while the flow measuring device is formed as a single continuous structure in the illustrated embodiment, in other embodiments, the flow measuring device may be formed from multiple components coupled to one another.

Because the flow measuring device 86 is formed as a single continuous structure (e.g., from a single piece of material), the flow measuring device 86 does not include a separate sleeve positioned between the venturi/other suitable flow path configuration and the intermediate flow passage. Because the flow measuring device does not include a separate sleeve, the cost of the flow measuring device may be significantly reduced (e.g., as compared to a flow measuring device that includes a venturi assembly disposed within a separate sleeve). In addition, due to the position of the flow measuring device relative to the end cap, the structure for providing the fluid to the fluid monitoring system may be simplified, as compared to a flow measuring device having a venturi assembly positioned remote from the end cap. For example, as previously discussed, in certain embodiments, the flow measuring device includes internal conduits configured to establish fluid communication between the throat of the venturi and the fluid monitoring system and between the inlet or outlet of the venturi and the fluid monitoring system. Accordingly, the structure for providing the fluid to the fluid monitoring system may be less complex than a structure in which a sleeve supports a venturi assembly remote from the end cap, separate conduits extend from the venturi assembly to the end cap, and recess(es) are formed in the sleeve to accommodate the separate conduits. As a result, the cost of the insertable flow meter assembly may be reduced. Furthermore, because the flow measuring device is in direct contact with the end cap or the flow measuring device is separated from the end cap by a gasket, a plug positioned between the venturi and the end cap may be obviated (e.g., as compared to a configuration in which a sleeve supports a venturi assembly remote from the end cap, and a plug is positioned between the venture assembly and the end cap), thereby further reducing the cost of the insertable flow meter assembly.

Furthermore, because the flow measuring device 86 is not structurally coupled to the end cap 88 in the illustrated embodiment, the flow measuring device may be removed and replaced without changing the end cap. For example, if the flow rate of the fluid through the choke assembly is expected to increase, the end cap 88 may be removed, and then the flow measuring device 86 may be extracted from the intermediate flow passage 62 via the end 96. A different flow measuring device (e.g., having the same outer cross-section and a different venturi configuration) may then be inserted into the intermediate flow passage 62 via the end 96, and the end cap 88 may be coupled to the body 50 of the choke assembly 48. As a result, the cost of each flow meter assembly may be reduced, as compared to flow meter assemblies in which the end cap and the flow measuring device are non-removably coupled to one another. Furthermore, because the flow measuring device is not structurally coupled to the end cap in the illustrated embodiment, the flow measuring device may be removed/omitted from the choke assembly without substantially affecting operation of the choke assembly (e.g., in embodiments in which monitoring the flow rate of the fluid through the choke assembly is not desired).

Furthermore, because the body 50 of the choke assembly 48 is configured to contain the pressure of the fluid flowing through the flow passages of the choke assembly body 50, the amount of material within the insertable flow meter assembly may be substantially reduced, as compared to a self-contained flow meter disposed between a fluid input and a fluid output, thereby substantially reducing the cost of the insertable flow meter assembly. Furthermore, because the body 50 of the choke assembly 48 is configured to contain the pressure of the fluid flowing through the flow passages of the choke assembly body 50, a single flow measuring device may be used for a variety of fluid pressures. For example, a common/single type of flow measuring device may be used within a low-pressure choke assembly and a high-pressure choke assembly. As a result, the number of insertable flow meter assembly types may be reduced, thereby reducing design costs of the resource extraction system.

While the fluid flows from the inlet flow passages to the outlet flow passages in the illustrated embodiment, in other embodiments and/or other operating conditions, the fluid may flow from the outlet flow passages to the inlet flow passages. In such embodiments/operating conditions, the fluid monitoring system may be configured to determine the flow rate of the fluid through the intermediate flow passage based on the pressure of the fluid at the throat and the pressure of the fluid at the inlet (e.g., which is the outlet while the fluid is flowing in the opposite direction) or outlet (e.g., which is the inlet while the fluid is flowing in the opposite direction). Furthermore, while the insertable flow meter assembly 84 is employed within a choke assembly 48 in the illustrated embodiment, in other embodiments, the insertable flow meter assembly may be employed within other suitable devices. For example, the flow measuring device of the insertable flow meter assembly may be inserted within a suitable flow passage of a receiving structure (e.g., body) of another suitable device, and the end cap may be coupled to the receiving structure at the end of the flow passage.

Figure 4:
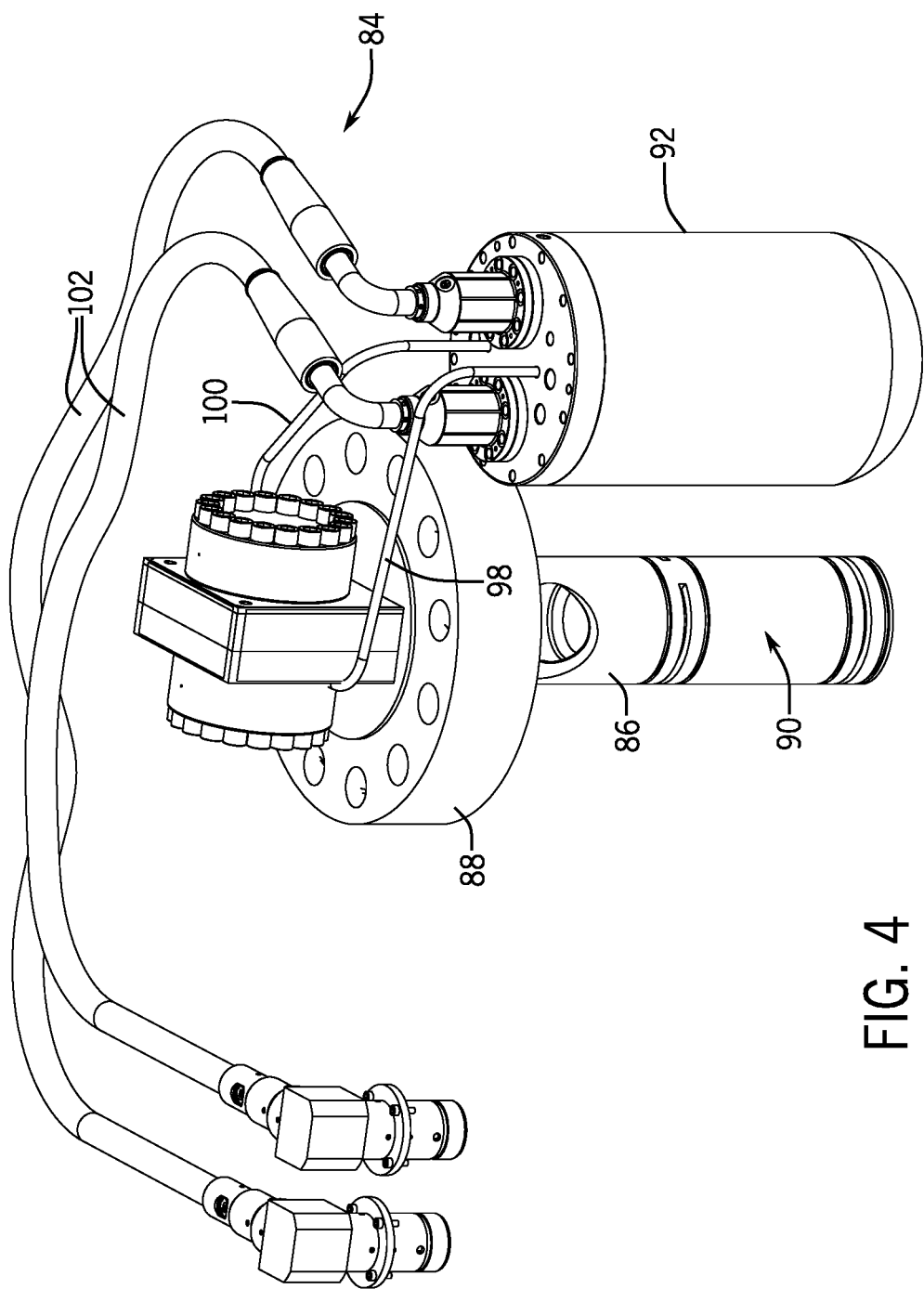
FIG. 4 is a perspective view of an embodiment of an insertable flow meter assembly that may be employed within the choke assembly of FIG. 3.

FIG. 4 is a perspective view of an embodiment of an insertable flow meter assembly 84 that may be employed within the choke assembly of FIG. 3. As previously discussed, the insertable flow meter assembly 84 includes the flow measuring device 86 and the end cap 88. In the illustrated embodiment, the flow measuring device 86 includes the venturi 90. As discussed in detail below, the flow measuring device 86 includes a first conduit configured to receive fluid from the throat of the venturi 90 and a second conduit configured to receive fluid from the inlet of the venturi 90. Each conduit terminates at a respective aperture of the flow measuring device 86. In addition, the end cap 88 includes corresponding apertures configured to receive the fluid from the apertures of the flow measuring device 86, and conduits extend through the end cap 88 from the end cap apertures. In the illustrated embodiment, a first hose 98 extends from a first conduit of the end cap 88 to the fluid monitoring system 92, and a second hose 100 extends from a second conduit of the end cap 88 to the fluid monitoring system 92. Accordingly, the fluid monitoring system 92 is fluidly coupled to the throat of the venturi 90 via the first hose 98, the first conduit of the end cap 88, and the first conduit of the flow measuring device 86. In addition, the fluid monitoring system 92 is fluidly coupled to the inlet of the venturi 90 via the second hose 100, the second conduit of the end cap 88, and the second conduit of the flow measuring device 86. However, in other embodiments, the fluid monitoring system may be fluidly coupled to the throat and/or to the inlet or outlet of the venturi by other suitable fluid connection(s).

As previously discussed, the fluid monitoring system 92 is configured to determine the flow rate of the fluid through the flow measuring device 86/respective flow passage based on the first pressure at the throat of the flow measuring device 86 (e.g., venturi 90) and the second pressure at the inlet or outlet of the flow measuring device 86 (e.g., venturi 90) (e.g., based on a difference between the first and second pressures). For example, the fluid monitoring system 92 may include a first pressure sensor configured to monitor the first pressure and a second pressure sensor configured to monitor the second pressure, and/or the fluid monitoring system 92 may include a pressure sensor configured to monitor the difference between the first and second pressures. In certain embodiments, the fluid monitoring system includes a controller communicatively coupled to the pressure sensor(s). In certain embodiments, the controller is an electronic controller having electrical circuitry configured to determine the flow rate based on the pressure(s). In such embodiment, the controller may include a processor, such as a microprocessor, and a memory device. The controller may also include one or more storage devices and/or other suitable components. The processor may be used to execute software, such as software for determining the flow rate based on the pressure(s), and so forth. Moreover, the processor may include multiple microprocessors, one or more "general-purpose" microprocessors, one or more special-purpose microprocessors, and/or one or more application specific integrated circuits (ASICS), or some combination thereof. For example, the processor may include one or more reduced instruction set (RISC) processors.

The memory device may include a volatile memory, such as random access memory (RAM), and/or a nonvolatile memory, such as read-only memory (ROM). The memory device may store a variety of information and may be used for various purposes. For example, the memory device may store processor-executable instructions (e.g., firmware or software) for the processor to execute, such as instructions for determining the flow rate, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for determining the flow rate, etc.), and any other suitable data. In the illustrated embodiment, electrical conductors 102 are communicatively coupled to the fluid monitoring system 92. The electrical conductors 102 are configured to output signal(s) indicative of the flow rate to a remote system (e.g., including a display configured to present flow rate data to an operator). While two electrical conductors 102 are communicatively coupled to the fluid monitoring system 92 in the illustrated embodiment, in other embodiments, more or fewer electrical conductors (e.g., 0, 1, 3, 4, or more) may be communicatively coupled to the fluid monitoring system. In addition, while the fluid monitoring system is communicatively coupled to the remote system via conductor(s) in the illustrated embodiment, in other embodiments, the fluid monitoring system may be communicatively coupled to the remote system via a wireless connection.

In certain embodiments, at least one pressure sensor may be positioned within the end cap. In such embodiments, at least one hose may be omitted, and one or more electrical conductors may extend from the sensor(s) to the controller (e.g., in a housing separate from the end cap), or the sensor(s) may be communicatively coupled to the controller by a wireless connection. Furthermore, in certain embodiments, each conduit within the end cap may extend to a respective membrane. The fluid pressure within the conduit may deform the membrane, thereby displacing liquid (e.g., oil) within the respective hose. The fluid monitoring system may be configured to monitor the liquid (e.g., the pressure of the liquid) to determine the pressure within the respective section of the flow measuring device. For example, in certain embodiments, the fluid monitoring system may include a differential pressure sensor configured to determine the pressure difference between the liquid in the first hose and the liquid in the second hose, thereby determining the pressure differential between the throat and the inlet or outlet of the flow measuring device.

While determining the flow rate of the fluid through the flow measuring device/respective flow passage based on the first pressure at the throat of the flow measuring device and the second pressure at the inlet or outlet of the flow measuring device (e.g., based on a difference between the first and second pressures) is disclosed above, other suitable parameters may be used in combination with the pressures/pressure differential to determine the flow rate. The other suitable parameters may include a temperature of the fluid, a density of the fluid, atmospheric pressure, a beta ratio, a discharge coefficient, other suitable parameter(s), or a combination thereof. The other suitable parameter may be measured (e.g., by one or more sensors), stored within the memory of the controller, received from an external source, or determined by the controller, for example.

Figure 5:
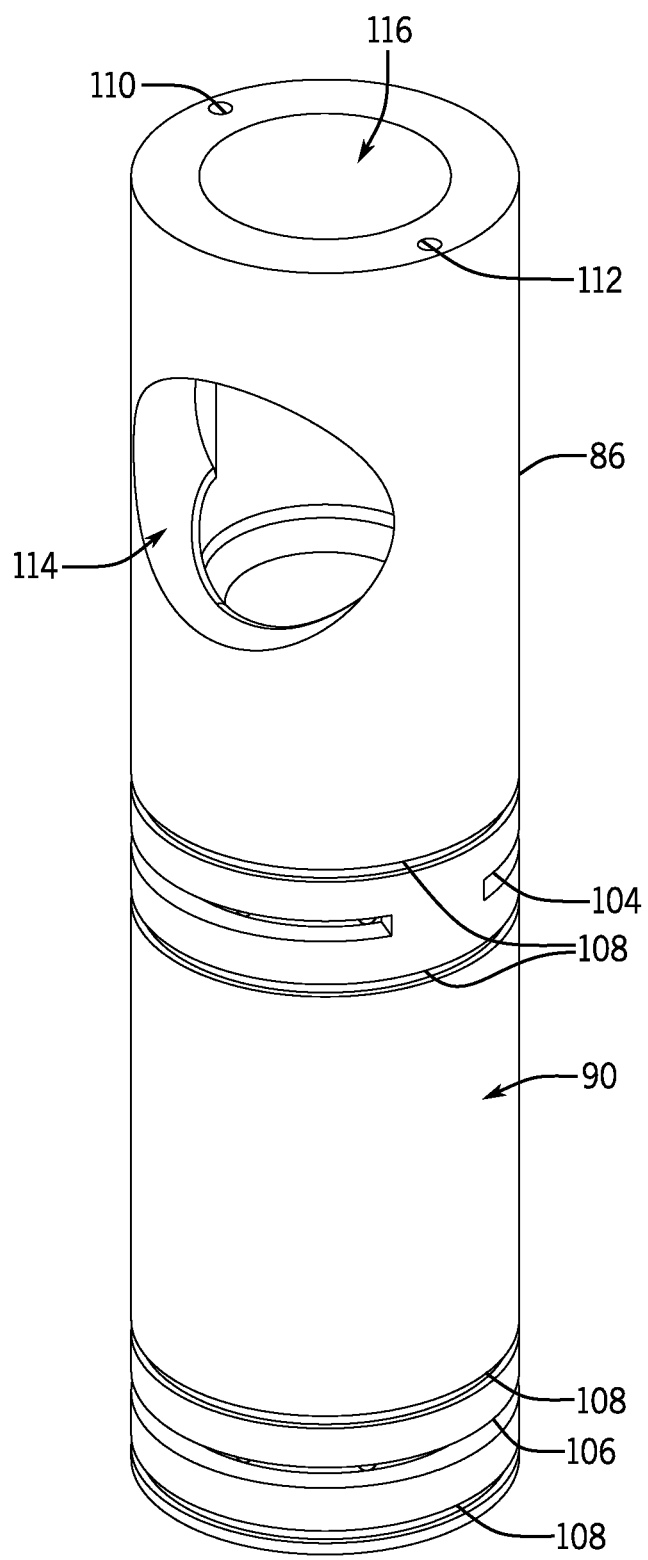
FIG. 5 is a perspective view of an embodiment of a flow measuring device that may be employed within the insertable flow meter assembly of FIG. 4.

FIG. 5 is a perspective view of an embodiment of a flow measuring device 86 that may be employed within the insertable flow meter assembly of FIG. 4. In the illustrated embodiment, the flow measuring device 86 includes a first recess 104 and a second recess 106. As discussed in detail below, the first recess 104 is fluidly coupled to the throat of the venturi 90 by first port(s), and the second recess 106 is fluidly coupled to the inlet of the venturi 90 by second port(s). In the illustrated embodiment, the first recess 104 is arcuate and extends about a portion of the periphery (e.g., circumference) of the flow measuring device 86. However, in other embodiments, the first recess may be annular or any other suitable configuration. Furthermore, in the illustrated embodiment, the second recess 106 is annular and extends about the entirety of the periphery (e.g., circumference) of the flow measuring device 86. However, in other embodiments, the second recess may be arcuate or any other suitable configuration.

In the illustrated embodiment, annular recesses 108 are positioned on each side (e.g., longitudinal side) of the first recess 104, and annular recesses 108 are positioned on each side (e.g., longitudinal side) of the second recess 106. The annular recesses are configured to receive respective seals (e.g., o-rings, etc.), and the seals are configured to contact the inner surface of the respective flow passage (e.g., the intermediate flow passage of the choke assembly). Accordingly, a substantially sealed cavity is formed at the first recess 104, and a substantially sealed cavity is formed at the second recess 106. The first recess 104/respective cavity is configured to receive fluid from the throat of the venturi 90 via the first port(s), and the second recess 106/respective cavity is configured to receive fluid from the inlet of the venturi 90 via the second port(s). As discussed in detail below, the throat is fluidly coupled to a first conduit via the first recess 104, and the first conduit extends to a first aperture 110. In addition, the inlet is fluidly coupled to a second conduit via the second recess 106, and the second conduit extends to a second aperture 112. As previously discussed, the end cap may include corresponding apertures configured to receive the fluid from the apertures of the flow measuring device 86, and conduits may extend through the end cap from the end cap apertures. The fluid monitoring system may be fluidly coupled to the conduits extending through the end cap, thereby enabling the fluid monitoring system to receive fluid from the throat and the inlet of the venturi. Furthermore, as previously discussed, at least one seal disposed within a respective annular recess 108 (e.g., seal(s) positioned proximate to the inlet) may be configured to block flow of fluid around the flow measuring device via contact with the inner surface of the respective flow passage (e.g., the intermediate flow passage of the choke assembly).

In the illustrated embodiment, the flow measuring device 86 includes an outlet 114 configured to expel the fluid substantially perpendicularly to a direction of flow of the fluid through the respective flow passage (e.g., the intermediate flow passage of the choke assembly). For example, the fluid may flow through the venturi 90 of the flow measuring device 86 along a longitudinal axis of the flow measuring device 86. The fluid may then be directed toward a subsequent flow passage (e.g., the second flow passage of the choke assembly). While the outlet is configured to expel the fluid substantially perpendicularly to the direction of the flow of the fluid through the respective flow passage in the illustrated embodiment, in other embodiments, the outlet may be configured to expel the fluid in any suitable direction. Furthermore, fluid flow through a longitudinal end 116 of the flow measuring device 86 is blocked by the end cap. As previously discussed, in certain embodiments, a gasket may be disposed between the longitudinal end 116 of the flow measuring device 86 and the end cap. The gasket may be configured to block flow of the fluid between the longitudinal end 116 of the flow measuring device 86 and the end cap, thereby causing substantially all of the fluid to exit the flow measuring device 86 through the outlet 114.

Figure 6:
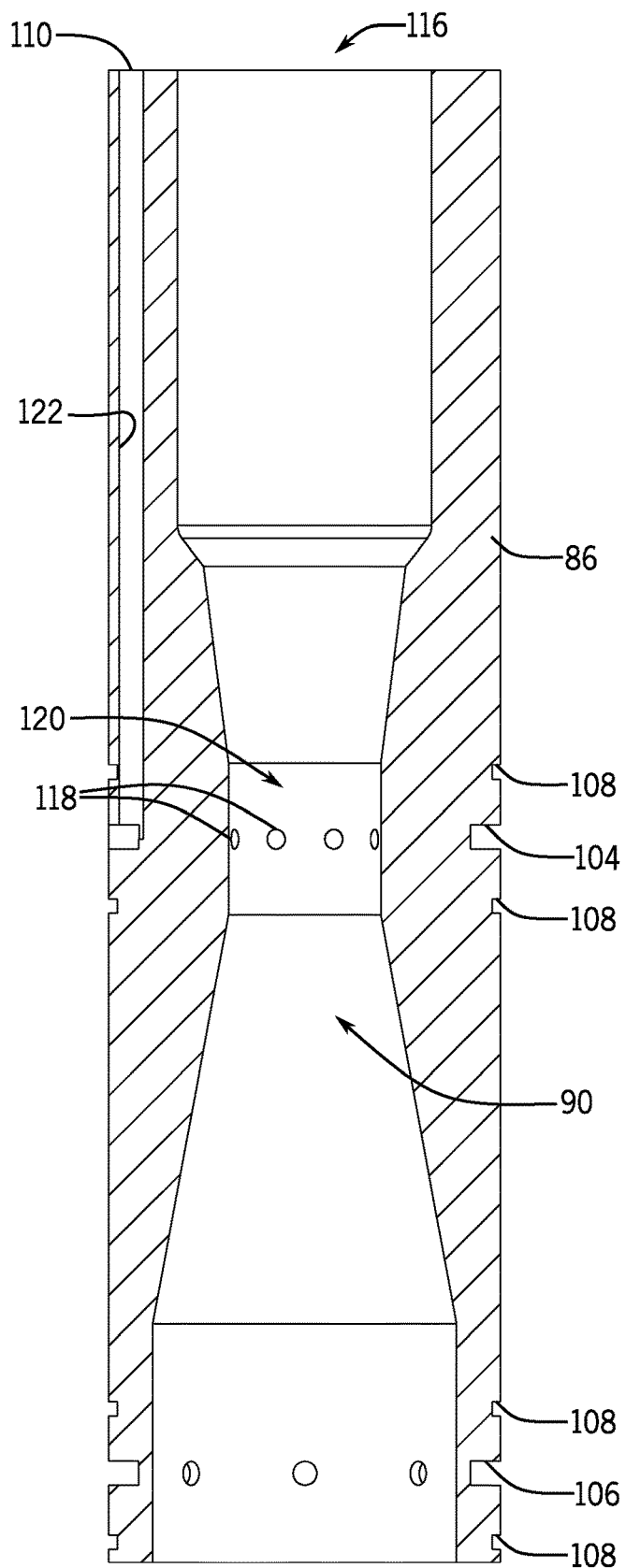
FIG. 6 is a cross-sectional view of the flow measuring device of FIG. 5.

FIG. 6 is a cross-sectional view of the flow measuring device 86 of FIG. 5. In the illustrated embodiment, multiple first ports 118 extend from the throat 120 of the venturi 90 to the first recess 104. While the flow measuring device 86 includes multiple first ports 118 in the illustrated embodiment, in other embodiments, the flow measuring device may include a single first port. As previously discussed, the throat 120 of the venturi 90 is fluidly coupled to the first conduit 122 via the first port(s) 118. In addition, the first conduit 122 is fluidly coupled to the first end cap conduit via the first aperture 110 at the longitudinal end 116 of the flow measuring device 86, and the first end cap conduit is fluidly coupled to the fluid monitoring system via the first hose. In certain embodiments (e.g., in embodiments in which the fluid is a gas), the first conduit 122 and the first recess 104 are configured to block flow of liquid to the fluid monitoring system. For example, the cross-sectional area of the first conduit 122 and the cross-sectional area of the first recess 104 may be selected to substantially reduce or eliminate the possibility of liquid moving upwardly through the first conduit 122 by capillary action. By way of example, the first conduit 122 may have a circular cross-section with a diameter greater than or equal to 5 mm, 6 mm, 8 mm, 10 mm, or 12 mm, and the cross-sectional area of the first recess 104 may be greater than or equal to the cross-sectional area of the first conduit 122.

While the flow measuring device 86 includes a single first conduit 122 in the illustrated embodiment, in other embodiments, the flow measuring device may include additional first conduits. Furthermore, while the flow measuring device 86 includes the first recess 104 in the illustrated embodiment, in other embodiments, the first recess may be omitted, and the first conduit(s) may be directly fluidly coupled to respective first port(s), or the first conduit(s) may be fluidly coupled to respective first port(s) by another suitable fluid connection (e.g., an internal cavity, etc.). While the fluid communication between the throat 120 of the venturi 90 and the fluid monitoring system is established by the first port(s) 118, the first recess 104, and the first conduit 122 within the flow measuring device 86 in the illustrated embodiment, in other embodiments, the fluid communication between the throat of the venturi and the fluid monitoring system may be established by another suitable fluid path (e.g., including one or more conduits external to the flow measuring device).

Figure 7:
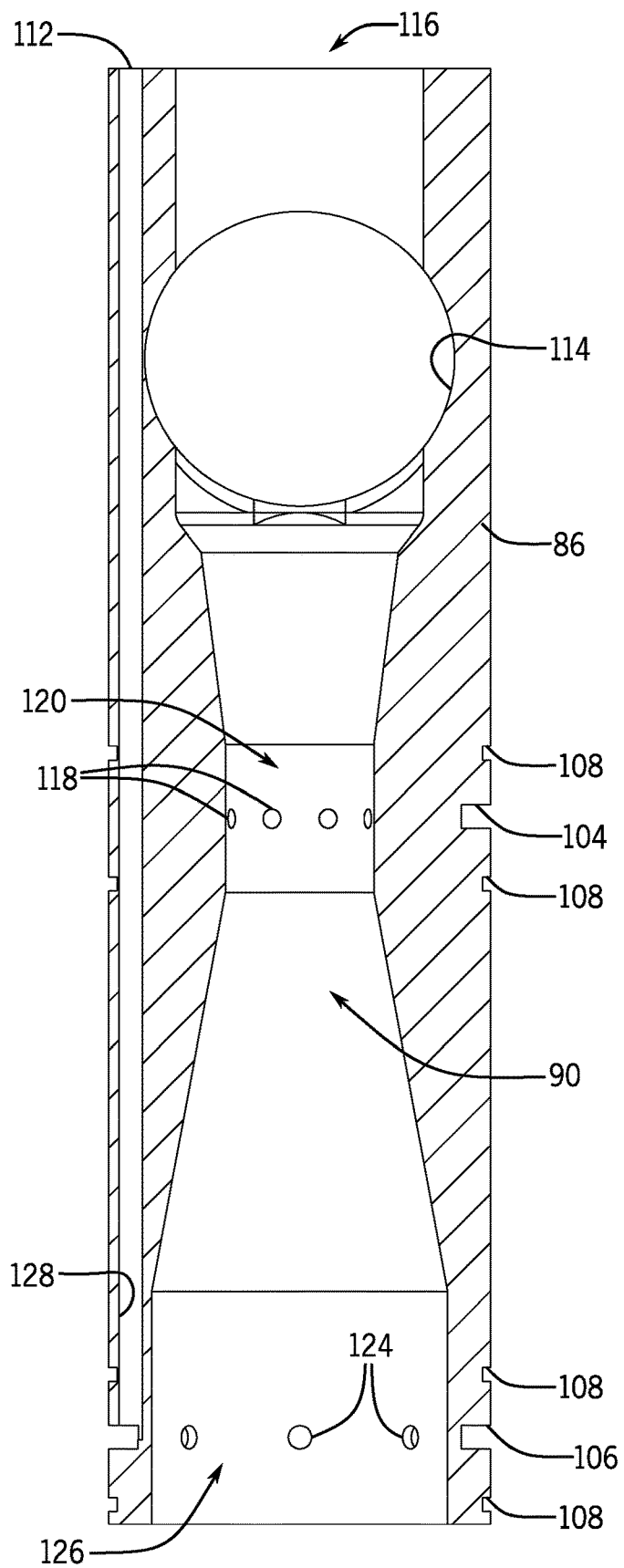
FIG. 7 is a cross-sectional view of the flow measuring device of FIG. 5.

FIG. 7 is a cross-sectional view of the flow measuring device 86 of FIG. 5. In the illustrated embodiment, multiple second ports 124 extend from the inlet 126 of the venturi 90 to the second recess 106. While the flow measuring device 86 includes multiple second ports 124 in the illustrated embodiment, in other embodiments, the flow measuring device may include a single second port. As previously discussed, the inlet 126 of the venturi 90 is fluidly coupled to the second conduit 128 via the second port(s) 124. In addition, the second conduit 128 is fluidly coupled to the second end cap conduit via the second aperture 112 at the longitudinal end 116 of the flow measuring device 86, and the second end cap conduit is fluidly coupled to the fluid monitoring system via the second hose. In certain embodiments (e.g., in embodiments in which the fluid is a gas), the second conduit 128 and the second recess 106 are configured to block flow of liquid to the fluid monitoring system. For example, the cross-sectional area of the second conduit 128 and the cross-sectional area of the second recess 106 may be selected to substantially reduce or eliminate the possibility of liquid moving upwardly through the second conduit 128 by capillary action. By way of example, the second conduit 128 may have a circular cross-section with a diameter greater than or equal to 5 mm, 6 mm, 8 mm, 10 mm, or 12 mm, and the cross-sectional area of the second recess 106 may be greater than or equal to the cross-sectional area of the second conduit 128.

While the flow measuring device 86 includes a single second conduit 128 in the illustrated embodiment, in other embodiments, the flow measuring device may include additional second conduits. Furthermore, while the flow measuring device 86 includes the second recess 106 in the illustrated embodiment, in other embodiments, the second recess may be omitted, and the second conduit(s) may be directly fluidly coupled to respective second port(s), or the second conduit(s) may be fluidly coupled to respective second port(s) by another suitable fluid connection (e.g., an internal cavity, etc.). While the fluid communication between the inlet 126 of the venturi 90 and the fluid monitoring system is established by the second port(s) 124, the second recess 106, and the second conduit 128 within the flow measuring device 86 in the illustrated embodiment, in other embodiments, the fluid communication between the inlet of the venturi and the fluid monitoring system may be established by another suitable fluid path (e.g., including one or more conduits external to the flow measuring device).

Because the flow measuring device of the illustrated embodiment includes internal conduits configured to fluidly couple the throat of the venturi to the fluid monitoring system and to fluidly couple the inlet of the venturi to the fluid monitoring system, the structure for providing the fluid to the fluid monitoring system may be less complex than a structure in which a sleeve supports a venturi assembly remote from the end cap, separate conduits extend from the venturi assembly to the end cap, and recess(es) are formed in the sleeve to accommodate the separate conduits. Accordingly, the cost of the insertable flow meter assembly may be significantly reduced. Furthermore, because the flow measuring device 86 is formed as a single continuous structure (e.g., from a single piece of material), including the internal conduits, the flow measuring device 86 does not include a separate sleeve positioned between the venturi and the respective flow passage. As a result, the cost of the insertable flow meter assembly may be significantly reduced (e.g., as compared to a flow meter that includes a venturi assembly disposed within a separate sleeve).

While the flow measuring device includes port(s) at the inlet of the venturi in the illustrated embodiment, in other embodiments, the flow measuring device may include ports at the outlet of the venturi. In such embodiments, one or more conduits may fluidly couple the port(s) at the outlet to respective aperture(s) at the longitudinal end of the flow measuring device. In addition, the fluid monitoring system may receive fluid from the outlet of the venturi via the port(s) and the conduit(s), and the fluid monitoring system may determine the flow rate of the fluid through the respective flow passage based on the pressure at the throat and the pressure at the outlet (e.g., based on a difference between the pressures).

In certain embodiments, the flow measuring device (e.g., including the venturi) may be reversible within the respective flow passage (e.g., the intermediate flow passage of the choke assembly). For example, the flow measuring device may be inserted into the respective flow passage such that the outlet receives the fluid and the inlet expels the fluid. In such embodiments, the flow measuring device may include a second set of conduits extending to a second set of apertures at the longitudinal end of the flow measuring device at/proximate to the inlet, thereby facilitating fluid communication between the second set of conduits and the fluid monitoring system. Flow of fluid through the first set of apertures may be blocked by a suitable structure, such as the body of the choke assembly or a gasket/pad positioned on the body of the choke assembly. In addition, the fluid monitoring system may be configured to determine the flow rate of the fluid through the respective flow passage based on the fluid pressure at the throat and the fluid pressure at the current outlet, which is the inlet while the flow measuring device is in the other orientation. Furthermore, in the embodiments disclosed herein, the flow measuring device is configured to enable determination of a flow rate of a single phase fluid (e.g., gas, etc.) through the respective flow passage (e.g., the intermediate flow passage of the choke assembly). However, in other embodiments, the flow measuring device may be configured to enable determination of a flow rate of a multi-phase fluid (e.g., gas and liquid) through the respective flow passage (e.g., the intermediate flow passage of the choke assembly). For example, the flow measuring device may include a fraction measurement system to enable determination of a multi-phase fluid flow rate.

While a flow measuring device including a venturi is disclosed herein, in certain embodiments, the flow measuring device may include another suitable flow path configuration (e.g., orifice plate, etc.). In such embodiments, the fluid monitoring system may be configured to determine the flow rate of the fluid through the respective flow passage based on the pressure at the throat and the pressure at the inlet or outlet of the other suitable flow path configuration. Furthermore, in certain embodiments, the flow measuring device may include a structure positioned within the flow path of the fluid through the respective flow passage (e.g., the intermediate flow passage of the choke assembly). The structure may be substantially conical, and the fluid may flow around the substantially conical structure as the fluid flows through the respective flow passage. A wider portion (e.g., base) of the structure may form the throat of the flow measuring device, and a narrower portion (e.g., tip) of the structure may form the inlet or the outlet of the flow measuring device. In certain embodiments, the structure may include a first port extending from the throat of the flow measuring device and a first conduit extending through the structure to a first aperture at a longitudinal end of the flow measuring device. The first conduit is configured to receive the fluid from the first port. In addition, the structure may include a second port extending from the inlet or the outlet of the flow measuring device and a second conduit extending through the structure to a second aperture at the longitudinal end of the flow measuring device. The second conduit is configured to receive the fluid from the second port. As previously discussed, the fluid monitoring system may be fluidly coupled to the first and second apertures (e.g., via the cap end conduits and the hoses), and the fluid monitoring system may be configured to determine the flow rate of the fluid through the respective flow passage based on a first pressure at the throat of the flow measuring device and a second pressure at the inlet or outlet of the flow measuring device. While the fluid monitoring system is fluidly coupled to the throat and the inlet or outlet via the internal conduits in the embodiment disclosed above, in other embodiments, the fluid monitoring system may be fluidly coupled to the throat and the inlet or outlet by any other suitable fluid connection. Furthermore, while a conical structure is disclosed above, the structure may have any other suitable shape (e.g., pyramidal, etc.). In addition, in certain embodiments, the structure may be formed as a single continuous structure (e.g., from a single piece of material).

In certain embodiments, the structure (e.g., conical structure) of the flow measuring device may be coupled to the end cap of the insertable flow meter assembly, and the end cap may position the structure in a suitable location within the respective flow passage. Additionally or alternatively, the structure may be coupled to a sleeve via extensions that extend between the sleeve and the structure. In such embodiments, an outer cross-section of at least a portion of the sleeve may be substantially the same as the inner cross-section of the flow passage. Accordingly, the extensions may position the structure in a suitable location within the respective flow passage. In addition, in certain embodiments, the flow measuring device (e.g., the structure, the extensions, and the sleeve) may be formed as a single continuous structure (e.g., from a single piece of material).

Technical effects of the disclosure include an insertable flow meter assembly having a flow measuring device that may be inserted into a flow passage of a receiving structure, thereby obviating pressure containing functionality of the flow meter. For example, because the receiving structure is configured to contain the fluid pressure, the size of the fluid meter may be substantially reduced, thereby enabling the insertable flow meter assembly to be used within space-limited environments. Additionally, technical effects of the disclosure include reducing the amount of material within the flow meter and enabling a single flow measuring device to be used for a variety of fluid pressures.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An insertable flow meter assembly, comprising:
   a flow measuring device configured to be inserted into a flow passage of a receiving structure, wherein the flow measuring device is configured to enable determination of a flow rate of fluid through the flow passage, the flow measuring device is formed as a single continuous structure, and an outer cross-section of at least a portion of the flow measuring device is configured to be substantially the same as an inner cross-section of the flow passage; and
   an end cap configured to engage an exterior surface of the receiving structure and to couple to the receiving structure at an end of the flow passage, wherein the end cap is configured to substantially seal the end of the flow passage, and the end cap is configured to block movement of the flow measuring device out of the end of the flow passage;
   wherein the flow measuring device comprises:
     a first port extending from a throat of the flow measuring device and configured to receive the fluid at the throat of the flow measuring device;
     a first conduit extending through the flow measuring device to a first aperture at a longitudinal end of the flow measuring device, wherein the first conduit is configured to receive the fluid from the first port;
     a second port extending from a section of the flow measuring device and configured to receive the fluid at the section of the flow measuring device, wherein the section comprises one of an inlet or an outlet of the flow measuring device; and
     a second conduit extending through the flow measuring device to a second aperture at the longitudinal end of the flow measuring device, wherein the second conduit is configured to receive the fluid from the second port.

2. The insertable flow meter assembly of claim 1, wherein the flow measuring device comprises a venturi.

3. The insertable flow meter assembly of claim 1, comprising a fluid monitoring system fluidly coupled to the first aperture and to the second aperture, wherein the fluid monitoring system is configured to determine the flow rate of the fluid through the flow passage based on a first pressure of the fluid at the throat of the flow measuring device and a second pressure of the fluid at the section of the flow measuring device.

4. The insertable flow meter assembly of claim 1, wherein the end cap is not structurally coupled to the flow measuring device.

5. The insertable flow meter assembly of claim 1, wherein the flow measuring device has an annular recess configured to receive a seal configured to substantially block flow of the fluid around the flow measuring device along the flow passage.

6. The insertable flow meter assembly of claim 1, wherein the flow measuring device has an outlet configured to expel the fluid substantially perpendicularly to a direction of flow of the fluid through the flow passage.

7. The insertable flow meter assembly of claim 1, comprising at least one fastener configured to couple the end cap to the receiving structure.

8. An insertable flow meter assembly, comprising:
   a flow measuring device configured to be inserted into a flow passage of a receiving structure, wherein the flow measuring device is configured to enable determination of a flow rate of fluid through the flow passage, the flow measuring device is formed as a single continuous structure, and the flow measuring device comprises:

a first port extending from a throat of the flow measuring device and configured to receive the fluid at the throat of the flow measuring device;

a first conduit extending through the flow measuring device to a first aperture at a longitudinal end of the flow measuring device, wherein the first conduit is configured to receive the fluid from the first port;

a second port extending from a section of the flow measuring device and configured to receive the fluid at the section of the flow measuring device, wherein the section comprises one of an inlet or an outlet of the flow measuring device; and a second conduit extending through the flow measuring device to a second aperture at the longitudinal end of the flow measuring device, wherein the second conduit is configured to receive the fluid from the second port; and an end cap configured to engage an exterior surface of the receiving structure and to couple to the receiving structure at an end of the flow passage, wherein the end cap is configured to substantially seal the end of the flow passage, and the end cap is configured to block movement of the flow measuring device out of the end of the flow passage.

9. The insertable flow meter assembly of claim 8, wherein an outer cross-section of at least a portion of the flow measuring device is configured to be substantially the same as an inner cross-section of the flow passage.

10. The insertable flow meter assembly of claim 8, comprising a fluid monitoring system fluidly coupled to the first aperture and to the second aperture, wherein the fluid monitoring system is configured to determine the flow rate of the fluid through the flow passage based on a first pressure of the fluid at the throat of the flow measuring device and a second pressure of the fluid at the section of the flow measuring device.

11. The insertable flow meter assembly of claim 8, wherein the flow measuring device has an annular recess configured to receive a seal configured to substantially block flow of the fluid around the flow measuring device along the flow passage.

12. The insertable flow meter assembly of claim 8, wherein the outlet of the flow measuring device is configured to expel the fluid substantially perpendicularly to a direction of flow of the fluid through the flow passage.

13. The insertable flow meter assembly of claim 8, wherein the end cap is not structurally coupled to the flow measuring device.

14. A choke assembly, comprising:
an inlet flow passage configured to receive fluid;
an intermediate flow passage offset from the inlet flow passage and configured to receive the fluid from the inlet flow passage;
an outlet flow passage configured to receive the fluid from the intermediate flow passage;
a valve assembly configured to control flow of the fluid through the outlet flow passage; and
an insertable flow meter assembly, comprising:
a flow measuring device disposed within the intermediate flow passage, wherein the flow measuring device is configured to enable determination of a flow rate of the fluid through the intermediate flow passage, the flow measuring device is formed as a single continuous structure, and an outer cross-section of the flow measuring device is substantially the same as an inner cross-section of the intermediate flow passage; and
an end cap engaged with an exterior surface of a body of the choke assembly and coupled to the body of the choke assembly at an end of the intermediate flow passage, wherein the end cap is configured to substantially seal the end of the intermediate flow passage, and the end cap is configured to block movement of the flow measuring device out of the end of the intermediate flow passage
wherein the flow measuring device comprises:
a first port extending from a throat of the flow measuring device and configured to receive the fluid at the throat of the flow measuring device;
a first conduit extending through the flow measuring device to a first aperture at a longitudinal end of the flow measuring device, wherein the first conduit is configured to receive the fluid from the first port;
a second port extending from a section of the flow measuring device and configured to receive the fluid at the section of the flow measuring device, wherein the section comprises one of an inlet or an outlet of the flow measuring device; and
a second conduit extending through the flow measuring device to a second aperture at the longitudinal end of the flow measuring device, wherein the second conduit is configured to receive the fluid from the second port.

15. The choke assembly of claim 14, wherein the flow measuring device comprises a venturi.

16. The choke assembly of claim 14, wherein the insertable flow meter comprises a fluid monitoring system fluidly coupled to the first aperture and to the second aperture, and the fluid monitoring system is configured to determine the flow rate of the fluid through the intermediate flow passage based on a first pressure of the fluid at the throat of the flow measuring device and a second pressure of the fluid at the section of the flow measuring device.

17. The choke assembly of claim 14, wherein the end cap is not structurally coupled to the flow measuring device.

18. The choke assembly of claim 14, comprising a first flow passage and a second flow passage, wherein:
the first flow passage extends substantially perpendicularly from the inlet flow passage, and the first flow passage is configured to receive the fluid from the inlet flow passage;
the intermediate flow passage extends substantially perpendicularly from the first flow passage, and the intermediate flow passage is configured to receive the fluid from the first flow passage;
the second flow passage extends substantially perpendicularly from the intermediate flow passage, and the second flow passage is configured to receive the fluid from the intermediate flow passage; and
the outlet flow passage is configured to receive the fluid from the second flow passage.

* * * * *